United States Patent [19]

Maida

[11] 3,768,386

[45] Oct. 30, 1973

[54] EXPOSURE DETERMINING DEVICE

[75] Inventor: Osamu Maida, Tokyo, Japan

[73] Assignee: Nippon Kogaku K.K., Tokyo, Japan

[22] Filed: Nov. 21, 1972

[21] Appl. No.: 308,570

[30] Foreign Application Priority Data

Nov. 29, 1971 Japan .............................. 46/112069

[52] U.S. Cl. ................................................ 95/10 CE
[51] Int. Cl. ................................................ G01j 1/44
[58] Field of Search .................................... 95/10 CE

[56] References Cited

UNITED STATES PATENTS 3,671,769 6/1972 Tomomitsu et al. ................ 95/10 X
3,699,857 10/1972 Wagner et al. ........................ 95/10

*Primary Examiner*—Samuel S. Matthews
*Assistant Examiner*—Michael L. Gellner
*Attorney*—Joseph M. Fitzpatrick et al.

[57] ABSTRACT

In an exposure determining device of the type in which a complementary symmetrical circuit including two npn and pnp transistors detects the balance of a bridge circuit including a photoelectric element thereby to indicate information of proper or improper exposure, any variation in the sensitivity resulting from the change-over of the source voltage for the exposure meter may be corrected to maintain the sensitivity at a predetermined level irrespective of the source voltage variation.

3 Claims, 3 Drawing Figures

14, 2, 6, 14,2,6,

EXPOSURE DETERMINING DEVICE

BACKGROUND OF THE INVENTION

1. Field of the Invention

This invention relates to exposure meters, and more particularly to such meters having means for correcting the variation in the insensitive zone width (or the range of allowance for proper exposure) thereof.

2. Description of the Prior Art

Circuitry for an exposure meter is known in which a complementary symmetrical circuit comprising npn and pnp transistors detects the balance of a bridge circuit including a photoelectric element thereby to indicate proper or improper exposure. Such exposure meter circuit, however, suffers from disadvantages as will be fully described hereinafter with reference to FIGS. 1 and 2 of the accompanying drawings.

SUMMARY OF THE INVENTION

I contribute by my invention, means of the described type which are improved over the prior art in that any variation in the width of the insensitive zone (this term will later be defined in detail) resulting from the changeover of the source voltage for the exposure meter (i.e., the change-over to a voltage source of different magnitude) is corrected thereby to maintain a predetermined width of the insensitive zone irrespective of the source voltage change-over.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENTS

By way of example, the change-over of the source voltage will herein be described with respect to a camera with an exposure meter circuit of the described type when it is removably equipped with an exposure control device for receiving a drive signal from the exposure meter circuit to operate an electrical drive source, such as motor or the like, properly to adjust the exposure factors such as the camera's lens aperture, shutter time, etc., to provide a proper exposure; and more specifically, the change-over from the voltage source contained in the exposure meter circuit itself to a voltage source contained in the removable automatic exposure control device. It is to be understood that the present invention is not restricted to such application, but is applicable to every case in which the source voltage of the exposure meter circuit is changed over to another source voltage of different magnitude.

Figure 1:
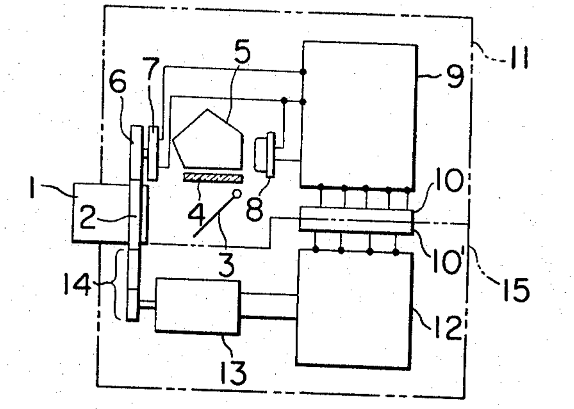
FIG. 1 PRIOR ART
FIG. 1 and 2 show a block diagram and circuitry of the automatic exposure meter according to the prior art.

Referring to FIG. 1, there is shown a block diagram of a camera containing therein a conventional exposure meter and having an automatic exposure control device 15 (later to be described) mounted thereto. It includes an objective lens 1, a preset aperture ring 2, a mirror 3, a focusing screen 4, a pentaprism 5, an introducing mechanism 6 through which exposure factors such as the F-value preset by the preset aperture ring 2, shutter time, film sensitivity, etc., may be introduced to a function resistor 7, and a photoelectric element 8 such as a cadmium sulfide (CdS) cell for detecting light passed through the focusing screen 4. An exposure meter unit 9 comprises a bridge circuit having its bridge arms provided by the photoelectric element 8 and function resistor 7, a bridge balance detecting circuit for detecting the balance of the bridge circuit and a circuit portion for indicating the balance of the bridge circuit. A connector 10 is provided with the camera body 11 to take a control signal out of the bridge balance detecting circuit, and another connector 10' is provided on the automatic exposure control device 15 and connected to a drive circuit 12, which will be described hereinafter. Upon assemblage of the automatic exposure control device 15 to the camera body 11, the connectors 10 and 10' are connected together thereby electrically to connect the exposure meter unit 9 with the drive circuit 12. The drive circuit 12 serves to drive a DC motor 13. An interlocking mechanism, generally designated 14, includes reduction gearing for transmitting rotation of the motor 13 to the preset aperture ring 2, and means for permitting the automatic exposure control device 15 to be removably mounted on the camera body 11. In FIG. 1, rotation of the motor 13 may be transmitted to the function resistor 7 through the interlocking mechanism 14, preset aperture ring 2 and introducing mechanism 6. The automatic exposure control device 15 comprises the drive circuit 12, the motor 13 and the interlocking mechanism 14 leading to the preset aperture ring 2, and is designed to adjust the preset aperture ring 2 or the F-value, in accordance with the output signal from the exposure meter unit 9, thereby to provide a proper exposure.

Figure 2:
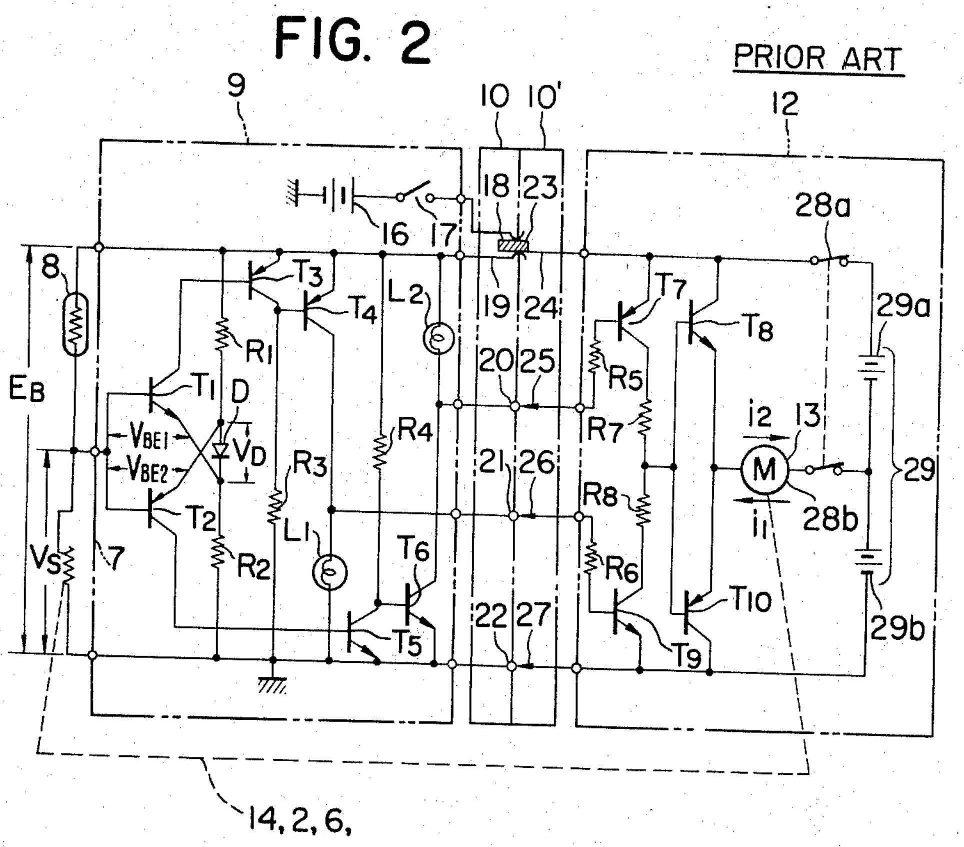
FIG. 2 PRIOR ART

FIG. 2 is a circuit diagram specifically showing the bridge circuit, the bridge balance detecting circuit, the bridge balance indicating circuit of the exposure meter unit in FIG. 1, and the drive circuit 12 for the automatic exposure control device 15. A bridge circuit is constituted by the photoelectric element 8, function resistor 7 and bridge resistors R1, R2 of equal resistance value, and a bridge balance detecting circuit is constituted by an npn transistor T1 and a pnp transistor T2. A diode D is inserted to reduce the width of the insensitive zone of the bridge balance detecting circuit, which will further be described, as well as to compensate for voltage reduction. The pnp transistors T3, T4 and npn transistors T5, T6 are arranged to amplify the collector current of the transistors T1, T2 which flows when the bridge circuit is unbalanced, and to switch the current to exposure indicator lamps L1, L2 which indicate proper or improper exposure in accordance with the balance or unbalance of the bridge circuit.

The connector 10 of the camera body 11 is provided with contact pieces 18, 19, 20, 21 and 22. When the connector 10' is disconnected from the connector 10, the contact pieces 18 and 19 are engaged with each other and connected to a voltage source 16 in the exposure meter unit 9 through switch 17. When the automatic exposure control device 15 is mounted to the camera body 11, and the connector 10' is connected to the connector 10, a switching contact piece, provided by a conductive contact member 24 of the connector 10' and an insulative contact member 23 on the member 24, are inserted between the contact pieces 18 and 19 electrically to insulate them from each other. Also, engagement between the contact piece 19 and the contact member 24 permits the exposure meter unit 9 to be supplied with a voltage from the voltage source means 29 of the automatic exposure control device 15 which is higher in voltage than the voltage source 16. The voltage source means 29 comprises a pair of voltage sources 29*a* and 29*b* which are equal in voltage. A pnp transistor T7 is connected to the collector of the transistor T6 through a resistor R5 and through the contact pieces of 20, 25 of the connectors 10, 10'. An npn transistor T9 is connected to the collector of the transistor T4 through a resistor R6 and through the contact pieces 21, 26 of the connectors 10, 10'. The collectors of the transistors T7 and T9 are connected to each other through resistors R7 and R8 of equal resistance value. The point of connection between the resistors R7 and R8 is connected to the bases of npn transistor T8 and pnp transistor T10. The emitters of the transistors T8 and T10 are connected to each other, and their point of connection is connected to one pole of the motor 13. The other pole of the motor 13 is connected to the point of connection between the voltage sources 29*a* and 29*b* through a switch 28*b* operatively associated with an automatic exposure control operating switch 28*a*.

Operation of the above-described arrangement will now be described.

When the photoelectric element 8 receives light through the objective lens 1, focusing screen 4 and pentaprism 5, it presents a resistance value as determined by its own characteristic. If the value of the function resistor 7 is lower than the resistance value of the photoelectric element 8, or if the aperture diameter determined by the preset aperture ring 2 in connection with the shutter speed and film sensitivity is smaller than the level for proper exposure, then the base potentials of the transistors T1 and T2 will become lower than the level during the balance of the bridge, thus rendering the transistors T2 and T1 conductive and non-conductive, respectively. As a result, the transistors T3 and T6 become non-conductive while the transistors T4 and T5 become conductive, the indicator lamp L1 turns on, and the indicator lamp L2 turns off, thus predicting an under-exposure. At the same time, the transistors T9 and T7 become conductive and non-conductive, respectively, and this renders the transistors T8 and T10 non-conductive and conductive, respectively. As a result, a current flows to the motor 13 in the direction of the arrow $i_1$, thereby energizing the motor 13. The interlocking and introducing mechanisms 14 and 6 are so-designed that such rotation of the motor 13 is transmitted in a direction to increase the aperture diameter for the preset aperture ring 2 and to increase the resistance value for the function resistor 7, respectively. Therefore, the motor 13 continues its rotation until the resistance values of the photoelectric element and function resistor 7 become equal to nullify the current indicated by arrow $i_1$. Consequently, the preset aperture ring 2 is driven in a direction to increase the aperture diameter to provide an aperture diameter corresponding to proper exposure.

Similarly, if the resistance value of the function resistor 7 is higher than the resistance value of the photoelectric element 8, or if the aperture diameter determined by the preset aperture ring 2 in connection with the shutter speed and film sensitivity is greater than the aperture diameter for proper exposure, then the transistor T2 will become non-conductive and the transistor T1 will become conductive. As a result, the indicator lamp L2 is turned on while the indicator lamp L1 is turned off, thereby predicting a condition of overexposure. At the same time, a current flows to the motor 13 in the direction of the arrow $i_2$ to rotate the motor in a direction opposite to the direction in which the motor was rotated by the current flowing in the direction of the arrow $i_1$ to reduce the aperture diameter for the preset aperture ring 2 and to reduce the resistance value for the function resistor 7. Such rotation continues until the resistance values of the photoelectric element 8 and function resistor 7 become equal to nullify the current $i_2$. As a result, the preset aperture ring 2 is driven in a direction to reduce the aperture diameter to provide an aperture diameter corresponding to proper exposure.

Similarly, if the resistance values of the photoelectric element 8 and function resistor 7 are equal, or if the aperture diameter determined by the present aperture ring 2 in connection with the shutter speed and film sensitivity corresponds to proper exposure, the transistors T1 and T2 are both in the non-conductive state so that both indicator lamps L1 and L2 are turned on to predict the condition of proper exposure. At the same time, the transistors T7 and T9 are rendered conductive, and in addition, the resistance values of the resistors R7 and R8 are equal, so that the base potentials of the transistors T8, T10 become equal to their emitter potentials, thus rendering the transistors T8 and T10 non-conductive, and permitting no current to flow to the motor 13, which is thus unrotated. In this manner, the operation of the exposure meter circuit 9 and the drive circuit 12 is controlled by the switching of the transistors T1 and T2.

Consideration will now be given to the variation in the sensitivity of the bridge balance detection resulting from the variation in the voltage of the voltage source.

In FIG. 2, $V_S$ represents a signal voltage produced at the point of connection between the photoelectric element 8 and the function resistor 7. $V_{BE1}$ and $V_{BE2}$ represent the threshold voltages of the transistors T1 and T2 or base-emitter voltages provided just before a base current flows to the transistors T1 and T2 to render them conductive. Where these transistors are silicon transistors, the threshold voltages are usually in the range from 0.4 to 0.45V. $E_B$ represents the source voltage, and $V_D$ is a bias voltage produced by the biasing diode D. Where the diode D is a silicon diode, the bias voltage is usually in the range from 0.6 to 0.7V. The resistance values of the resistors R1 and R2 are equal as mentioned above. Let $V_{S1}$ and $V_{S2}$ be the levels of the signal voltage $V_S$ just prior to the conduction of the transistors T1 and T2, respectively. Then, $$V_{S1} = \{R2(E_B - V_D)/(R1 + R2)\} + V_{BE1} \ldots \quad (1)$$

$$V_{S2} = \{R2(E_B - V_D)/(R1 + R2)\} + V_D - V_{BE2} \ldots \quad (2)$$

For simplification, it is assumed that $V_{BE1} = V_{BE2} = V'_{BE}$. Since R1 = R2, $$V_{S1} = \{(E_B - V_D)/2\} + V'_{BE} \ldots \quad (3)$$

$$V_{S2} = \{(E_B - V_D)/2\} + V_D - V'_{BE} \ldots \quad (4)$$

Here it is assumed that the resistance value of the function resistor 7 is fixed at $R_V$ and that the resistance value of the photoelectric element 8 is $R_{ph1}$ and $Rph_2$ for signal voltages $V_{S1}$ and $V_{S2}$, respectively.

$$V_{S1} = E_B \cdot R_V/(Rph_1 + R_V) \ldots \quad (5)$$

$$V_{S2} = E_B \cdot R_V/(Rph_2 + R_V) \ldots \quad (6)$$

Since equation (3) equals equation (5) and equation (4) equals equation (6), $$Rph_1 = R_V(E_B + V_D - 2V'_{BE})/(E_B - V_D + 2V'_{BE}) \quad (7)$$

$$Rph_2 = R_V(E_B - V_D + 2V'_{BE})/(E_B + V_D - 2V'_{BE}) \quad (8)$$

$V_D = 0.6 - 0.7$V and $V'_{BE} = 0.4 - 0.45$ V, hence $V_D < 2V'_{BE}$ and accordingly, $Rph_1 < Rph_2$.

In order to render the transistor T1 conductive, $V_S$ must be greater than the level $V_{S1}$ represented by equation (5), and this means that the transistor T1 can conduct when the resistance value of the photoelectric element 8 is lower than $Rph_1$.

Similarly, in order to render the transistor T2 conductive, $V_S$ must be smaller than the level $V_{S2}$ represented by equation (6), and this means that the transistor T2 can conduct when the resistance value of the photoelectric element 8 is higher than $Rph_2$. Thus, when the resistance value of the photoelectric element 8 is between $Rph_1$ and $Rph_2$ and varied within such range, both transistors T1 and T2 will be in non-conductive state to turn on both indicator lamps L1 and L2 thereby to predict the proper exposure.

The range within which the transistors T1 and T2 are invariably maintained non-conductive as determined by the resistance values $Rph_1$ and $Rph_2$ of the photoelectric element 8 is referred to as "insensitive zone."

The width of such insensitive zone is subsequently converted into a light value. Let EV1 and EV2 represent the light values for the resistance values of the photoelectric element Rph and $Rph_1$ and $Rph_2$, respectively. Then, the light values and the brightness of an object to be photographed are in the following relations:

$$2^{EV1} = k.B1,\ 2^{EV} = k.B2 \ldots \quad (9)$$

where B1 is the brightness of the object when Rph = $Rph_1$, B2 is the brightness of the object when Rph = $Rph_2$, and $k$ is constant.

Also, the brightness of the object and the resistance value of the photoelectric element are in the relations:

$$Rph_1 = \alpha \cdot B1^{-\gamma},\ Rph_2 = \alpha \cdot B2^{-\gamma} \quad (10)$$

where $\gamma$ is a specific constant determined by the photoelectric element and $\alpha$ is constant.

From equations (9) and (10), the width of the insensitive zone represented as $Rph_1 < Rph < Rph_2$ may be expressed in terms of optical value, as follows:

$$EV1 - EV2 = (1/\gamma \ln 2) \ln (Rph_2/Rph_1) \ldots \quad (11)$$

If $\Delta EV = EV1 - EV2$, equation (11) may be rewritten thus:

$$\Delta EV = (1/\gamma \ln_2) \ln (Rph_2/Rph_1) \ldots \quad (12)$$

By applying equations (7) and (8) to equation (12), $$\Delta EV = (2/\gamma \ln_2) \ln (E_B - V_D + 2V'_{BE}/E_B + V_D - 2V'_{BE}) \ldots \quad (13)$$

Thus, if any fluctuation of the bridge balance caused during metering due to the circuit characteristic is within $\pm \Delta$ EV/2 about the balance point of the bridge, such state will be indicated as the balanced state of the bridge. Therefore, the indication of the exposure is variable within the range of $\Delta$ EV, and the factors which determine the range of $\Delta$ EV are $\gamma$, $E_B$, $V_D$ and $V'_{BE}$. The influence of $\Delta$ EV upon the voltage may be calculated with $\gamma = 0.5$, $V'_{BE} = 0.45$V and $V_D = 0.6$V (which is assumed to be invariable with variation in the source voltage), and for comparison of two cases, i.e., $E_B = 3$V and $E_B = 6$V.

When $E_B = 6$V, $$\Delta EV = (2/0.5 \times \ln_2) \ln (6 - 0.6 + 0.9/6 + 0.6 - 0.9) \div 0.58 \ldots \quad (14)$$

When $E_B = 3$V, $$\Delta EV = (2/0.5 \times \ln_2) \ln (3 - 0.6 + 0.9/3 + 0.6 - 0.9) \div 1.16 \ldots \quad (15)$$

It can be seen that the width of the insensitive zone for 3V is twice that for 6V. Actually, however, the bias voltage $V_D$ is increased and decreased with the increase and decrease in the source voltage, and therefore the variation in the width of the insensitive zone will be double or more.

A greater value of $\Delta$ EV causes a greater irregularity of the proper exposure, that is, the sensitivity of the exposure meter is reduced. To avoid this, the increase of $\Delta$ EV caused by the change-over of the source voltage must be minimized. In equation (13), the term $$\ln (E_B - V_D + 2V'_{BE}/E_B + V_D - 2V_{BE})$$

is affected by the source voltage $E_B$, and it will be seen from this that the increase of $\Delta$ EV may be minimized by correcting the bias voltage $V_D$ or $2V'_{BE}$ simultaneously with the change-over of the source voltage $E_B$. However, $2V'_{BE}$ is a value determined by the physical properties of transistors and may not be governed. Accordingly, it is $V_D$ that must be corrected. Since, however, $V_D$ must be stable with respect to the source voltage variation, the saturation voltage of the diode D is used as $V_D$. Therefore, it is undesirable to insert a resistor between the emitters of the transistors T1 and T2 and in series with the diode D thereby to increase the voltage between those emitters because this will greatly vary the voltage between them with respect to the source voltage variation. If the diode D comprises a silicon diode and a plurality of such diodes is arranged in series, the result will be that $V_D = 0.6N - 0.7N$ ($N = 1,2$ and so on), which, in turn, means that the condition $V_D < 2V'_{BE}$ would not be satisfied when $N > 1$. When $V_D > 2V'_{BE}$, the insensitive zone will disappear so that when the bridge is balanced, the transistors T1 and T2 will both be biased into their conductive state, thus failing to effect the indication of proper exposure. Germanium diodes, if used instead of silicon diodes, would satisfy the aforesaid condition, but actually the use of such diodes is not desirable because that would not solve the problem of the irregularity of $2V'_{BE}$ and $V_D$ which will very adversely affect Δ EV.

The present invention utilizes transistors in place of the conventional diode for the bias and reduced voltage compensation thereby to permit $V_D$ to be freely selected so that $V_D$ may be corrected upon change-over of the source voltage so as always to provide a predetermined insensitive zone width and to compensate for any irregularity of the insensitive zone width Δ EV which would result from the irregularity of $V_{BE1}$ and $V_{BE2}$ of transistors T1 and T2, thus overcoming the disadvantages noted above with respect to the prior art.

Figure 3:
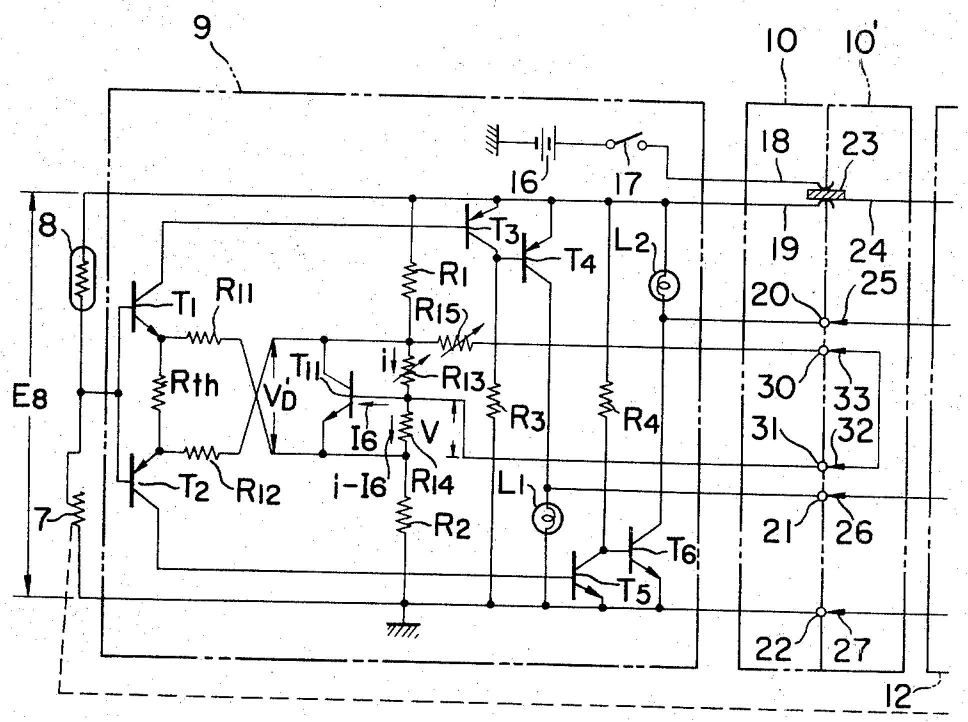
FIG. 3 illustrates circuitry in an embodiment of the present invention.

The present invention will now be described with reference to FIG. 3 which shows a preferred embodiment thereof.

Between resistors R1 and R2 of equal resistance value forming one of the balance output terminals of a bridge, there are serially connected a semi-fixed resistor R13 and fixed resistor R14. A biasing transistor T11 has the collector thereof connected to the point of connection between resistors R1 and R13, the base thereof connected to the point of connection between resistors R13 and R14, and the emitter thereof connected to the point of connection between resistors R2 and R14. The emitter of the transistor T1 is connected to the emitter of the transistor T11 via a temperature compensating resistor R11, and the emitter of the transistor T2 is connected to the collector of the transistor T11 via the temperature compensating resistor R12. A temperature compensating thermistor Rth is connected between the transistors T1 and T2. A voltage change-over correction resistor R15 has one end thereof connected to the collector of the transistor T11 and the other end thereof connected to a contact piece 30 provided on a connector 10. The point of connection between resistors R13 and R14 and the base of transistor T11 is connected to another contact piece 31 provided on the connector 10. The connector 10', adapted for connection to the connector 10 upon assemblage of the automatic exposure control device 15 to the camera body 11, is provided with a contact piece 33 which cooperates with the contact piece 30 to form a pair, and a contact piece 32 which cooperates with the contact piece 31 to form a pair. The contact pieces 33 and 32 are short-circuited, and adapted to short-circuit between the contact pieces 30 and 31 of the connector 10 upon connection of the connector 10' to the connector 10. The contact pieces 33 and 32, with the contact pieces 30 and 31, constitute a voltage change-over sensor member. The other connections are similar to those in FIG. 2, and illustration of the drive circuit 12 is omitted in FIG. 3. $V'_D$ represents the bias voltage between the collector and emitter of the biasing transistor T11. $V_{BE3}$ represents the base-emitter voltage and $I_B$ represents the base current of the transistor T11. The current flowing through the resistor R13 inserted between the base and collector of the transistor T11 is represented by $i$. If the DC amplification rate $h_{FE}$ of the transistor T11 is sufficiently great and if the resistor R13 is selected so as to satisfy the relation that $h_{FE}$R1 >> R13, $$I_B = i - (V_{BE3}/\mathrm{R14}) \ldots \quad (16)$$

$$i = \{(E_B - V'_D)/2\mathrm{R1}\} - h_{FE}\mathrm{IB} \ldots \quad (17)$$

$$V'_D = i\mathrm{R13} + V_{BE3} \ldots \quad (18)$$

Equations (16) and (17) give:

$$i = \{(E_B - V'_D)/2\mathrm{R1} + (h_{FE}V_{BE3}/\mathrm{R14})\}/(h_{FE} + 1) \ldots \quad (19)$$

Equations (19) and (18) give:

$$V'_D = \mathrm{R13}E_B/\{2(h_{FE} + 1)\,\mathrm{R1} + \mathrm{R13}\} + 2(h_{FE} + 1)\mathrm{R1}\{\mathrm{R13}h_{FE}/\mathrm{R14}(h_{FE} + 1) + 1\}\{V_{BE3}/2(h_{FE} + 1)\mathrm{R1} + \mathrm{R13}\} \ldots \quad (20)$$

Since $h_{FE} >> 1$ and $2h_{FE}\mathrm{R1} >> \mathrm{R13}$, $$V'_D = (\mathrm{R13}/\mathrm{R14} + 1)\,V_{BE3} \ldots \quad (21)$$

By selecting the resistors R1, R2, R13 and R14 so that the transistor T11 is operated in the saturation range of the base-emitter voltage of the transistor 11, $V_{BE3}$ may be maintained substantially at a predetermined value, such as 0.6 to 0.7V, in the case of a silicon transistor, independently of the source voltage variation.

Equation (21) shows that the bias voltage $V'_D$ can be stable without being affected by the source voltage variation and any value of $V'_D$ can be freely obtained by varying the resistance ratio of the resistors R13 and R14. Therefore, the bias voltage $V'_D$ can be suitably changed over by providing a sensor member for sensing the change-over of the source voltage thereby to change over the resistance value of the resistor R13 and R14 represented by equation (21), thus ensuring a predetermined insensitive zone width irrespective of the source voltage change-over.

In the illustrated embodiment of the present invention, the relatively low voltage source 16, for example, supplies a voltage to the exposure meter circuit when the connectors 10 and 10' are disconnected, and the resistor R13 is preadjusted to provide an optimum insensitive zone width under such condition.

When the connectors 10 and 10' are connected (or when the automatic exposure control device 15 is assembled to the camera body), the voltage source is changed over to the relatively high voltage source 29 for driving the motor 13 in FIG. 2, and simultaneously therewith, a correction resistor R15 is parallel-connected to the resistor R13 (this is accomplished by the connection between the contact pieces 30 and 33 and between the contact pieces 31 and 32), the correction resistor R15 being pre-adjusted so as to reduce $V'_D$ thereby to correct the reduced insensitive zone width resulting from the increased source voltage until it is equal to the insensitive zone width for the low source voltage.

In the above-described embodiment of the present invention, the resistance value between the base and collector of the biasing transistor T11 may be varied by the correction resistor R15 parallel-connected with the resistor R13 in response to the source voltage change-over, thereby correcting the bias voltage and accordingly, correcting the variation in the insensitive zone width which results from the source voltage change-over. Of course, however, a resistor corresponding to the resistor R15 may be parallel-connected to the resistor R14 in response to the source voltage change-over, or alternatively the resistor R13 or R14 may be changed over to another resistor mechanically in response to the connection of the connector 10' to the connector 10. In brief, it is essential that the resistance value of the resistor R13 between the base and collector of the biasing transistor T11 or of the resistor R14 between the emitter and base of that transistor be changed over by the voltage change-over sensor member thereby to change over the bias voltage $V'_D$ so as to correct the variation in the insensitive zone width, and from this it will be apparent that the present invention is not limited to the illustrated embodiment.

It will thus be appreciated that the present invention changes over the source voltage of the exposure meter to another source voltage of different magnitude and simultaneously therewith, corrects the variation in the insensitive zon width resulting from such change of the source voltage value, thereby to maintain a predetermined insensitive zone width irrespective of the variation in the source voltage value caused by such change-over and correct any variation in the insensitive zone width without adversely affecting any other element. Therefore, the present invention can eliminate any irregularity of proper exposure caused by the variation in the insensitive zone width which, in turn, results from the variation in the source voltage value, thus ensuring a stable proper exposure to be provided irrespective of the variation in the source voltage value.

I believe that the construction and operation of my novel exposure determining device will now be understood, and that its advantages will be fully appreciated by those persons skilled in the art.

I claim:

1. An exposure determining device comprising:

an interchangeable voltage source;

a bridge circuit including a photoelectric element adapted to receive light from an object to be photographed, a first resistance element having one end connected to one end of said photoelectric element, said first resistance element being variable for controlling the balance of said bridge circuit and for introducing an exposure factor, a second resistance element having one end connected to the other end of said photoelectric element, and a third resistance element having one end connected to the other end of said first resistance element;

means for detecting the balance of the bridge circuit, said detecting means including an npn transistor whose base terminal is connected to the junction between said photoelectric element and said first resistance element and whose emitter terminal is connected to the other end of said third resistance element, and a pnp transistor whose base terminal is connected to said junction and whose emitter terminal is connected to the other end of said second resistance element, said detecting means producing a first electrical signal representing proper exposure when the base potential of said two transistors is within a range extending a predetermined value from their potential during the balance of the bridge circuit, and producing a second electrical signal representing improper exposure when said base potential is out of said range;

a pair of resistors connected in series with each other between the other end of said second and third resistance elements, the value of each of said resistance elements affecting the magnitude of said range;

a third transistor whose base terminal is connected to the junction between said resistors and whose emitter and collector terminals are connected between the other ends of said second and third resistance elements;

means for varying the resistance value of at least one of said pair of resistors so that the magnitude of said range is not varied when said voltage source is interchanged with a source of different voltage; and control circuit means connected to said collector terminals of said npn and pnp transistors to receive said first and second signals from said detecting means for determining a proper exposure.

2. An exposure determining device according to claim 1, wherein said resistance varying means automatically varies the resistance value in response to the change-over of the voltage source.

3. An exposure determining device according to claim 2, wherein said resistance varying means includes an additional resistor, said additional resistor being parallel-connected to at least one of said pair of resistors upon the change-over of the voltage source.

* * * * *